(12) United States Patent
Park et al.

(10) Patent No.: US 10,805,835 B2
(45) Date of Patent: Oct. 13, 2020

(54) METHOD FOR TRANSMITTING MESSAGE AND USER EQUIPMENT

(71) Applicant: LG ELECTRONICS INC., Seoul (KR)

(72) Inventors: Sangmin Park, Seoul (KR); Jinsook Ryu, Seoul (KR); Jaehyun Kim, Seoul (KR); Taehun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 18 days.

(21) Appl. No.: 16/088,056

(22) PCT Filed: Mar. 24, 2017

(86) PCT No.: PCT/KR2017/003207
§ 371 (c)(1),
(2) Date: Sep. 24, 2018

(87) PCT Pub. No.: WO2017/164696
PCT Pub. Date: Sep. 28, 2017

(65) Prior Publication Data
US 2019/0116519 A1    Apr. 18, 2019

Related U.S. Application Data

(60) Provisional application No. 62/312,480, filed on Mar. 24, 2016, provisional application No. 62/418,182, filed on Nov. 6, 2016.

(51) Int. Cl.
*H04W 28/06* (2009.01)
*H04W 92/16* (2009.01)
(Continued)

(52) U.S. Cl.
CPC ........... *H04W 28/06* (2013.01); *H04W 28/12* (2013.01); *H04W 92/04* (2013.01); *H04W 92/16* (2013.01); *H04W 84/042* (2013.01)

(58) Field of Classification Search
None
See application file for complete search history.

(56) References Cited

U.S. PATENT DOCUMENTS 8,971,847 B2    3/2015  Somasundaram et al.
2002/0006111 A1*  1/2002  Akita ................... H04B 10/272
                                            370/235
(Continued)

FOREIGN PATENT DOCUMENTS

EP    2608581      6/2013
KR    101213285    12/2012
(Continued)

OTHER PUBLICATIONS

European Patent Office Application Serial No. 17770666.0, Search Report dated Jul. 19, 2019, 8 pages.
(Continued)

*Primary Examiner* — Huy D Vu
*Assistant Examiner* — Bao G Nguyen
(74) *Attorney, Agent, or Firm* — Lee Hong Degerman Kang Waimey

(57) ABSTRACT

When a non-access stratum (NAS) message is generated in an NAS layer of a user equipment, the NAS layer transfers the NAS message and type information to an access stratum (AS) layer of the user equipment. An AS message containing the NAS message is transmitted to a network. The type information indicates whether the NAS message is a first type message containing user data or a second type message without user data.

4 Claims, 12 Drawing Sheets

(51) Int. Cl.
*H04W 28/12* (2009.01)
*H04W 92/04* (2009.01)
*H04W 84/04* (2009.01)

(56) References Cited

U.S. PATENT DOCUMENTS

| | | | |
|---|---|---|---|
| 2011/0092236 A1* | 4/2011 | Iwamura | H04L 63/123 |
| | | | 455/507 |
| 2014/0057566 A1* | 2/2014 | Watfa | H04W 48/16 |
| | | | 455/41.2 |
| 2014/0219183 A1 | 8/2014 | Xu et al. | |
| 2014/0334418 A1 | 11/2014 | Urie et al. | |

FOREIGN PATENT DOCUMENTS

| | | |
|---|---|---|
| WO | 2007078159 | 7/2007 |
| WO | 2009055414 | 4/2009 |
| WO | 2012149982 | 11/2012 |

OTHER PUBLICATIONS

PCT International Application No. PCT/KR2017/003207, Written Opinion of the International Searching Authority dated Jun. 23, 2017, 18 pages.

Alcatel-Lucent, et al., "Introduction of Control Plane CIoT EPS optimization", 3GPP TSG SA WG2 Meeting #112, S2-161170, Feb. 2016, 31 pages.

* cited by examiner (a) UE-P-GW user plane with E-UTRAN (b) Control Plane UE-MME

METHOD FOR TRANSMITTING MESSAGE AND USER EQUIPMENT

CROSS-REFERENCE TO RELATED APPLICATIONS

This application is the National Stage filing under 35 U.S.C. 371 of International Application No. PCT/KR2017/003207, filed on Mar. 24, 2017, which claims the benefit of U.S. Provisional Application No. 62/312,480, filed on Mar. 24, 2016, and 62/418,182, filed on Nov. 6, 2016, the contents of which are all hereby incorporated by reference herein in their entireties.

TECHNICAL FIELD

The present invention relates to a wireless communication system and, more particularly, to a message transmission method and apparatus.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services anytime and anywhere by connecting a plurality of devices and objects to each other is one main issue to be considered in future-generation communication.

Further, a communication system to be designed in consideration of services/UEs sensitive to reliability and latency is under discussion. The introduction of future-generation RAT has been discussed by taking into consideration eMBB communication, mMTC, ultra-reliable and low-latency communication (URLLC), and the like.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With the development of smart devices, a new method for efficiently transmitting/receiving a small amount of data or infrequently occurring data is required.

The technical objects that can be achieved through the present invention are not limited to what has been particularly described hereinabove and other technical objects not described herein will be more clearly understood by persons skilled in the art from the following detailed description.

Technical Solution

According to an aspect of the present invention, provided herein is a method of transmitting a message by a user equipment (UE), wherein the method may comprise: generating a non-access stratum (NAS) message by a NAS layer of the UE; transferring the NAS message and type information to an access stratum (AS) layer of the UE by the NAS layer of the UE, where the type information may indicate whether the NAS message is a first type message with user data or a second type message with no user data; and transmitting an AS message containing the NAS message to a network. According to another aspect of the present invention, provided herein is a method of transmitting a message by a mobility management entity (MME) for transmitting a message, wherein the method may comprise: generating a non-access stratum (NAS) message by a NAS layer of the MME, where the type information may indicate whether the NAS message is a first type message with user data or a second type message with no user data; and transferring the NAS message and type information to an S1-AP layer of the MME by the NAS layer of the MME; and transmitting an S1-AP message containing the NAS message to a base station of a user equipment.

According to a further aspect of the present invention, provided herein is a user equipment (UE) for transmitting a message. The UE includes a transceiver, and a processor configured to control the transceiver. The processor of the UE may: generate a non-access stratum (NAS) message at a NAS layer of the UE; transfer the NAS message and type information from the NAS layer of the UE to an access stratum (AS) layer of the UE, where the type information may indicate whether the NAS message is a first type message with user data or a second type message with no user data; and control the transceiver to transmit an AS message containing the NAS message to a network. According to a still further aspect of the present invention, provided herein is a mobility management entity (MME) for transmitting a message. The MME includes a transceiver, and a processor configured to control the transceiver. The processor of the MME may: generate a non-access stratum (NAS)

message by a NAS layer of the MME; and transfer the NAS message and type information to an S1-AP layer of the MME by the NAS layer of the MME, where the type information may indicate whether the NAS message is a first type message with user data or a second type message with no user data; and control the transceiver to transmit an S1-AP message containing the NAS message to a base station of a user equipment.

In each aspect of the present invention, the AS message may include the type information. In each aspect of the present invention, the S1-AP message may include the type information.

In each aspect of the present invention, when a plurality of NAS messages to be transmitted through a same signaling radio bearer (SRB) are present in the AS layer of the UE, the AS layer of the UE may transmit a NAS message corresponding to the second type message earlier than a NAS message corresponding to the first type message, based on type information of each of the plurality of NAS messages. In each aspect of the present invention, when there are a plurality of NAS messages to be transmitted through a same signaling radio bearer (SRB), the MME may transmit a NAS message corresponding to the second type message earlier than a NAS message corresponding to the first type message, based on type information of each of the plurality of NAS messages.

In each aspect of the present invention, the AS message may be a radio resource control (RRC) message.

In each aspect of the present invention, the AS layer of the UE may transmit the AS message through a first signaling radio bearer (SRB) or a second SRB, based on the type information. In each aspect of the present invention, the MME may receive data for the user equipment through an S1-U or S11 interface from a serving gateway.

In each aspect of the present invention, the first SRB may be SRB1 with a packet data convergence protocol (PDCP) and the second SRB may be a new SRB with a same configuration as that of the SRB1 but with no PDCP.

In each aspect of the present invention, the type information from the NAS layer of the UE may further indicate whether the UE is using control plane cellular Internet of things (IoT) evolved packet system (EPS) optimization using a control plane for transport of the user data. If the UE is using the control plane CIoT EPS optimization, the AS message may be transmitted through the new SRB and otherwise, the AS message may be transmitted through the SRB1. In each aspect of the present invention, when the user equipment is using control plane CIoT EPS optimization, the MME may receive the data for the user equipment through the S11 interface from the serving gateway and otherwise, receive the data through the S11 interface from the serving gateway. In each aspect of the present invention, when the user equipment is using control plane CIoT EPS optimization and the NAS message includes user data, the type information from the NAS layer of the MME may be set as the first type message and otherwise, the type information may be set as the second type message.

The above technical solutions are merely some parts of the examples of the present invention and various examples into which the technical features of the present invention are incorporated can be derived and understood by persons skilled in the art from the following detailed description of the present invention.

Advantageous Effects

According to the present invention, uplink/downlink signals can be efficiently transmitted/received. Therefore, overall throughput of a radio communication system can be improved.

According to the present invention, a low-complexity/low-cost UE can communicate with the network while maintaining backward compatibility with the legacy system.

According to the present invention, a UE can be implemented with low complexity/low cost.

According to the present invention, a UE can communicate with the network in narrowband.

According to the present invention, a small amount of data can be efficiently transmitted/received.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate examples of the invention and together with the description serve to explain the principle of the invention.

MODE FOR INVENTION

Figure 1:
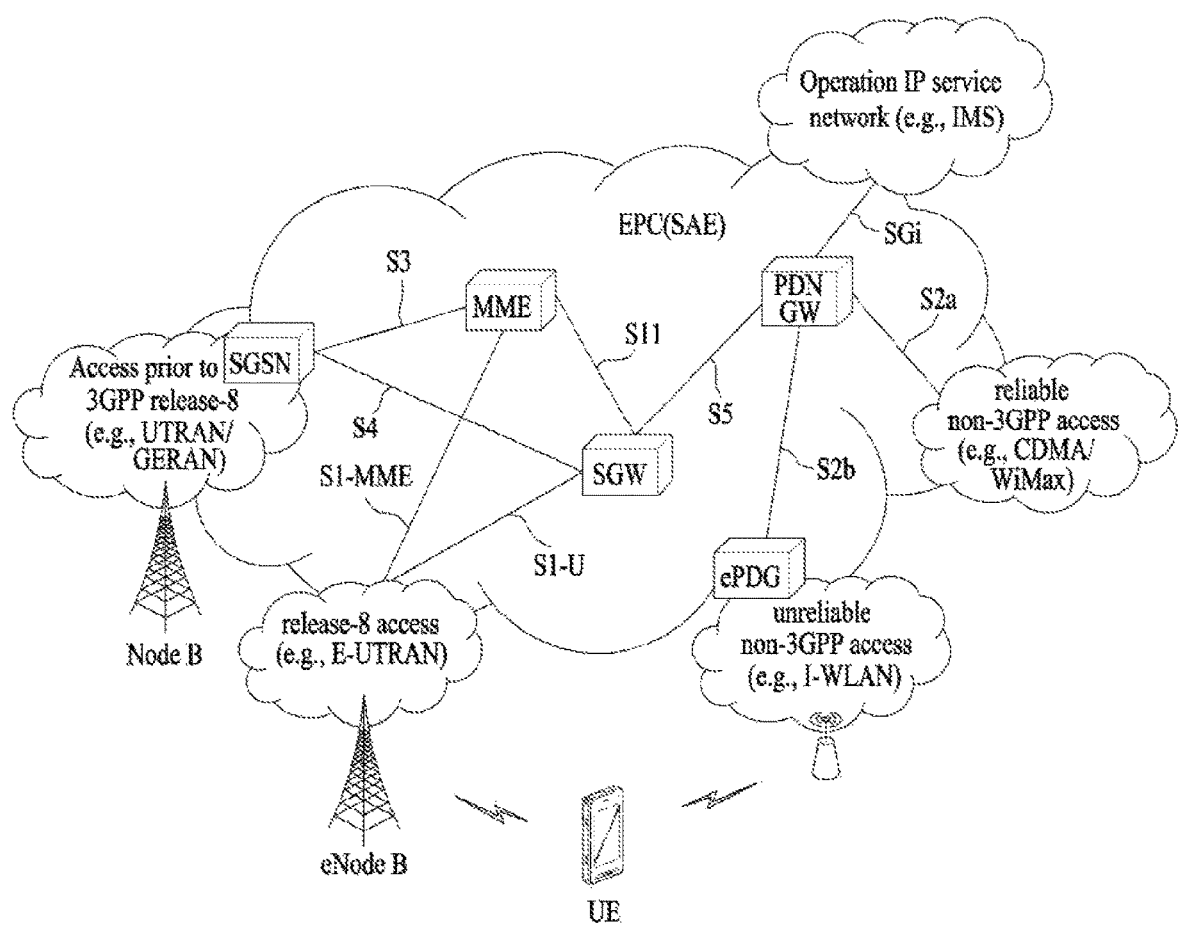
FIG. 1 is a schematic diagram showing the structure of an evolved packet system (EPS) including an evolved packet core (EPC).

Although the terms used in the present invention are selected from generally known and used terms while considering functions of the present invention, they may vary according to intention or customs of those skilled in the art or emergence of new technology. Some of the terms mentioned in the description of the present invention may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

The examples of the present invention described hereinbelow are combinations of elements and features of the present invention. The elements or features may be considered selective unless mentioned otherwise. Each element or feature may be practiced without being combined with other elements or features. Further, an example of the present invention may be constructed by combining parts of the elements and/or features. Operation orders described in examples of the present invention may be rearranged. Some constructions or features of any example may be included in another example and may be replaced with corresponding constructions or features of another example.

In the description of the attached drawings, a detailed description of known procedures or steps of the present invention will be avoided lest it should obscure the subject matter of the present invention. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a" (or "an"), "one", "the", etc. may include a singular representation and a plural representation in the context of the present invention (more particularly, in the context of the following claims) unless indicated otherwise in the specification or unless context clearly indicates otherwise.

The examples of the present invention can be supported by standard specifications disclosed for at least one of wireless access systems including an institute of electrical and electronics engineers (IEEE) 802.xx, a 3rd generation partnership project (3GPP) system, a 3GPP Long Term Evolution (3GPP LTE) system, and a 3GPP2 system. That is, steps or parts that are not described to clarify the technical features of the present invention may be explained with reference to the above standard specifications.

In addition, all terms set forth herein may be explained by the above standard specifications. For example, one or more of standard specifications, such as 3GPP TS 36.211, 3GPP TS 36.213, 3GPP TS 36.321, 3GPP TS 36.322, 3GPP TS 36.323, 3GPP TS 36.331, 3GPP TS 23.401, 3GPP TS 24.301, 3GPP TS 23.228, 3GPP TS 29.228, 3GPP TS 23.218, 3GPP TS 22.011, and 3GPP TS 36.413 may be referenced.

Reference will now be made in detail to the examples of the present disclosure with reference to the accompanying drawings. The detailed description, which will be given below with reference to the accompanying drawings, is intended to explain exemplary examples of the present disclosure, rather than to show the only examples that can be implemented according to the invention.

Specific terms used for the examples of the present invention are provided to aid in understanding of the present invention. These specific terms may be replaced with other terms within the scope and spirit of the present invention.

The terms used in this specification are defined as follows.

IMS (IP Multimedia Subsystem or IP Multimedia Core Network Subsystem): An architectural framework for providing standardization for delivery of voice or other multimedia services over Internet protocol (IP).

UMTS (Universal Mobile Telecommunications System): Global System for Mobile Communication (GSM)-based 3rd generation mobile communication technology developed by 3GPP.

EPS (Evolved Packet System): A network system configured by an EPC (Evolved Packet Core), which is an Internet Protocol (IP)-based packet switched (PS) core network and an access network such as LTE, UTRAN, etc. The EPS is evolved from UMT.

NodeB: A base station of GERAN/UTRAN which is installed outdoors and has coverage of a macro cell scale.

eNodeB/eNB: A base station of E-UTRAN which is installed outdoors and has coverage of a macro cell scale.

UE (User Equipment): A user equipment. The UE may be referred to as a terminal, ME (Mobile Equipment), MS (Mobile Station), or the like. The UE may be a portable device such as a notebook computer, cellular phone, PDA (Personal Digital Assistant), smartphone, and multimedia device, or may be a non-portable device such as a PC (Personal Computer) and vehicle-mounted device. The term UE or terminal in the description of MTC may refer to an MTC device.

HNB (Home NodeB): A base station of a UMTS network. The HNB is installed indoors and has coverage of a micro cell scale.

HeNB (Home eNodeB): A base station of an EPS network. The HeNB is installed indoors and has coverage of a micro cell scale.

MME (Mobility Management Entity): A network node of the EPS network performing functions of Mobility Management (MM) and Session Management (SM).

PDN-GW (Packet Data Network-Gateway)/PGW/P-GW: A network node of the EPS network performing functions of UE IP address allocation, packet screening and filtering, and charging data collection.

SGW (Serving Gateway)/S-GW: A network node of the EPS network performing functions of mobility anchor, packet routing, idle mode packet buffering, and triggering of the MME paging the UE.

PCRF (Policy and Charging Rule Function): A network node of the EPS network making a policy decision for dynamically applying a differentiated QoS and charging policy on a service flow basis.

OMA DM (Open Mobile Alliance Device Management): A protocol designed for management of mobile devices such as a cellular phone, a PDA, and a portable computer, that performs functions of device configuration, firmware upgrade, and error report.

OAM (Operation Administration and Maintenance): A group of network management functions that provides network defect indication, performance information, and data and diagnosis functions.

NAS (Non-Access Stratum): An upper stratum of a control plane between the UE and the MME. The NAS is a functional layer for signaling between a UE and a core network and exchange of a traffic message between the UE and the core network in LTE/UMTS protocol stack. The NAS mainly functions to support UE mobility and a session management procedure for establishing and maintaining IP connection between a UE and a P-GW.

EMM (EPS Mobility Management): A sub-layer of a NAS layer, that may be in either an "EMM-Registered" or "EMM-Deregistered" state depending on whether a UE is attached to or detached from a network.

ECM (EMM Connection Management) connection: A signaling connection for exchange of a NAS message, established between the UE and an MME. The ECM connection is a logical connection consisting of an RRC connection between the UE and an eNB and an S1 signaling connection between the eNB and the MME. If the ECM connection is established/terminated, the RRC connection and the S1 signaling connection are all established/terminated as well. To the UE, an established ECM connection means having an RRC connection established with the eNB and, to the MME, the established ECM connection means having an SI signaling connection established with the eNB. Depending on whether a NAS signaling connection, i.e., the ECM connection, is established, ECM may be in either "ECM-Connected" or "ECM-Idle" state.

AS (Access-Stratum): This includes a protocol stack between the UE and a wireless (or access) network and is in charge of data and network control signal transmission.

NAS configuration MO (Management Object): An MO used in the process of configuring parameters related to NAS functionality for the UE.

PDN (Packet Data Network): A network where a server (e.g., an MMS (Multimedia Messaging Service) server, a WAP (Wireless Application Protocol) server, etc.) supporting a specific service is located.

PDN connection: A logical connection between a PDN and a UE represented by one IP address (one IPv4 address and/or one IPv6 prefix).

APN (Access Point Name): A text sequence for indicating or identifying a PDN. A requested service or network is accessed through a specific P-GW. The APN means a predefined name (text sequence) in a network so as to discover this P-GW. (e.g., internet.mnc012.mcc345.gprs).

RAN (Radio Access Network): A unit including a NodeB, an eNodeB and an RNC (Radio Network Controller) for controlling the NodeB and the eNodeB in a 3GPP network. The RAN is present between UEs and provides connection to the core network.

HLR (Home Location Register)/HSS (Home Subscriber Server): A database containing subscriber information of a 3GPP network. The HSS can perform functions such as configuration storage, identity management and user state storage.

PLMN (Public Land Mobile Network): A network configured for the purpose of providing mobile communication services to individuals. This network can be configured per operator.

ANDSF (Access Network Discovery and Selection Function): One network entity that provides a policy to discover and select access that the UE can use with respect to each service provider.

EPC path (or infrastructure data path): A user plane communication path through an EPC.

E-RAB (E-UTRAN Radio Access Bearer): Concatenation of an S1 bearer and a data radio bearer corresponding to the S1 bearer. If the E-RAB is present, there is one-to-one mapping between the E-RAB and an EPS bearer of a NAS.

GTP (GPRS Tunneling Protocol): A group of IP-based communication protocols used to carry a general packet radio service (GPRS) within GSM, UMTS, and LTE networks. In 3GPP architectures, GTP and proxy mobile IPv6 based interfaces are specified on various interface points. The GTP can be decomposed into some protocols (e.g., GTP-C, GTP-U, and GTP'). GTP-C is used within a GPRS core network for signaling between gateway GPRS support nodes (GGSN) and serving GPRS support nodes (SGSN). GTP-C allows the SGSN to activate a session on a user's behalf (e.g., PDN context activation), deactivate the same session, adjust quality of service parameters, or update a session for a subscriber that has just arrived from another SGSN. GTP-U is used to carry user data within the GPRS core network and between a radio access network and a core network.

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network.

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference Point | Description |
| --- | --- |
| S1-MME | Reference point for the control plane protocol between E-UTRAN and MME. |
| S1-U | Reference point between E-UTRAN and Serving GW for the per bearer user plane tunneling and inter eNB path switching during handover. |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and Serving GW. |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses.) |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
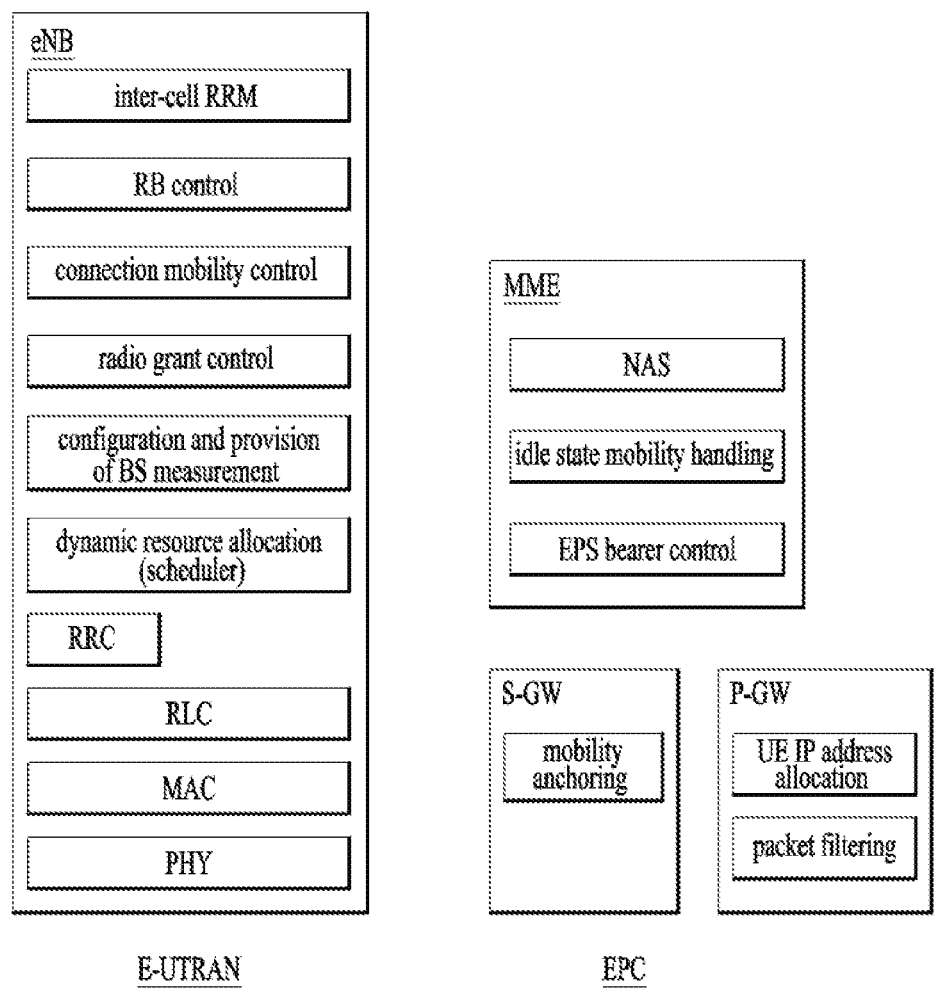
FIG. 2 is a diagram exemplarily illustrating architectures of a general E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
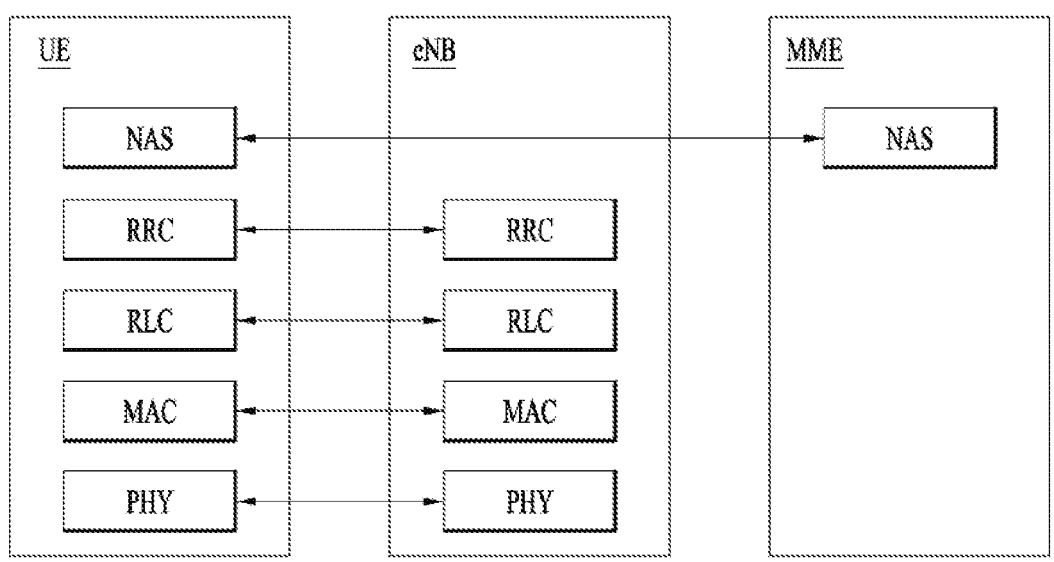
FIG. 3 is a diagram exemplarily illustrating the structure of a radio interface protocol in a control plane.
Figure 4:
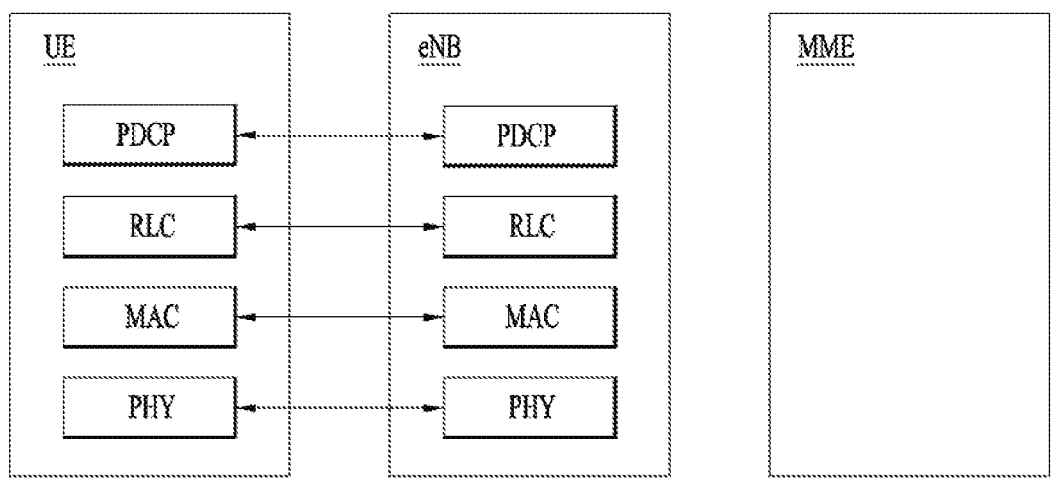
FIG. 4 is a diagram exemplarily illustrating the structure of a radio interface protocol in a user plane.

FIG. 3 is a diagram exemplarily illustrating the structure of a radio interface protocol in a control plane between a UE and an eNB, and FIG. 4 is a diagram exemplarily illustrating the structure of a radio interface protocol in a user plane between the UE and the eNB.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interface.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interface having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

RBs are broadly classified into (user) data radio bearers (DRBs) and signaling radio bearers (SRBs). The SRBs are defined as RBs used only for transport of RRC and NAS messages. Particularly, the following three SRBs are currently defined:

SRB0 is for RRC messages using the common control channel (CCCH) logical channel;

SRB1 is for RRC messages (which may include a piggybacked NAS message) as well as for NAS messages prior to the establishment of SRB2, all using dedicated control channel (DCCH) logical channel;

SRB2 is for RRC messages which include logged measurement information as well as for NAS messages, all using DCCH logical channel. SRB2 has a lower-priority than SRB1 and is always configured by E-UTRAN after security activation.

Once security is activated, all RRC messages on SRB1 and SRB2, including those containing NAS or non-3GPP messages, are integrity protected and ciphered by PDCP. NAS independently applies integrity protection and ciphering to the NAS messages.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The NAS forms the highest stratum of the control plane between a UE and an MME. The main functions of the protocols that are part of the NAS are to support mobility of the UE and session management procedures for establishing and maintaining IP connectivity between the UE and a P-GW. The NAS security is an additional function of the NAS that provides services to the NAS protocols, for example, integrity protection and ciphering of NAS signaling messages. To support these functions, elementary procedures for EPS mobility management (EMM) and elementary procedures for EPS session management (ESM) are supplied. Further, complete NAS transactions consist of specific sequences of elementary procedures.

Hereinafter, the procedures used for mobility management for EPS services at the radio interface will be described. The main function of a mobility management sublayer is to support the mobility of the UE such as informing the network of its current location and providing user identity confidentiality. Another function of the mobility management sublayer is to provide connection management services to a session management (SM) sublayer and a short message services (SMS) entity of a connection management (CM) sublayer. All EMM procedures can be performed only when a NAS signaling connection has been established between the UE and network. Otherwise, the EMM sublayer initiates the establishment of the NAS signaling connection. Depending on how the EMM procedures can be initiated, the EMM procedures can be classified into the following three types: EMM common procedures; EMM specific procedures; and EMM connection management procedures (S1 mode only). The EMM common procedures can always be initiated while the NAS signaling connection exists. In the case of the EMM specific procedures, only one UE initiated EMM specific procedure can be running at any time. The EMM specific procedures include attach, detach, tracking area update, etc. The EMM connection management procedures include service request, paging request, transport of NAS messages, and generic transport of NAS messages.

The ESM (EPS Session Management) belonging to the NAS layer performs functions such as default bearer management and dedicated bearer management to control a UE to use a PS service from a network. In other words, the main function of an ESM sublayer is to support EPS bearer context handling in the UE and MME. The ESM includes a procedure(s) for the activation, deactivation and modification of EPS bearer contexts and a procedure(s) for the request for resources (IP connectivity to a PDN or dedicated bearer resources) by the UE. In addition, when a UE establishes the initial connection to a specific packet data network (PDN) to access to the network, the default EPS bearer resource may be allocated by the network. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

The details of the EMM and ESM procedures could be found in 3GPP TS 24.301.

Figure 5:
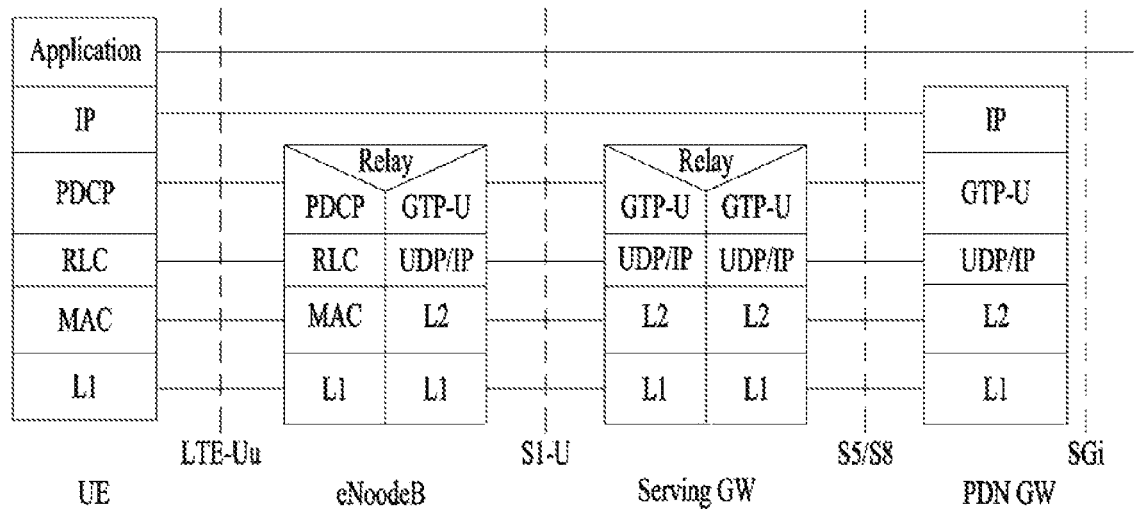
FIG. 5 is a diagram illustrating LTE (Long Term Evolution) protocol stacks for a user plane and a control plane.
Figure 5:
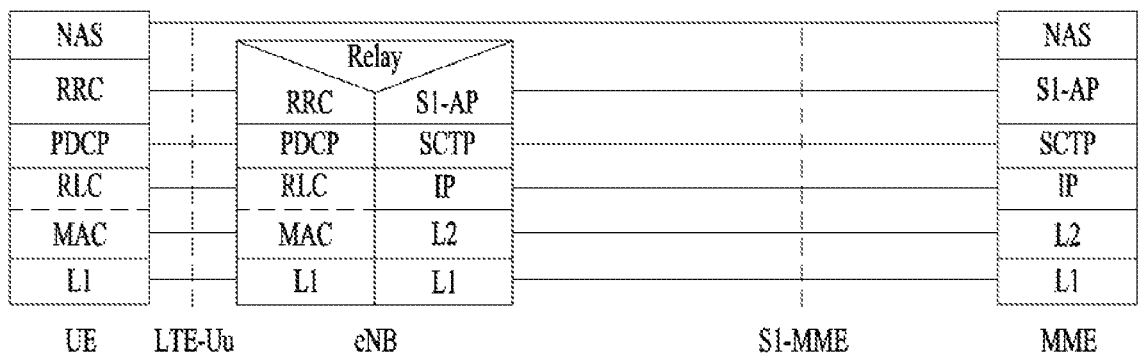

FIG. 5 illustrates LTE protocol stacks for a user plane and a control plane. FIG. 5(a) illustrates user plane protocol stacks over UE-eNB-SGW-PGW-PDN and FIG. 5(b) illustrates control plane protocol stacks over UE-eNB-MME-SGW-PGW. Functions of key layers of the protocol stacks will now be briefly described below.

Referring to FIG. 5(a), a GTP-U protocol is used to forward user IP packets over an S1-U/S5/X2 interface. If a GTP tunnel is established to forward data during LTE handover, an end marker packet is transferred to the GTP tunnel as the last packet.

Referring to FIG. 5(b), an S1-AP protocol is applied to an S1-MME interface. The S1-AP protocol supports functions such as S1 interface management, E-RAB management, NAS signaling delivery, and UE context management. The S1-AP protocol transfers an initial UE context to the eNB in order to set up E-RAB(s) and then manages modification or release of the UE context. A GTP-C protocol is applied to S11/S5 interfaces. The GTP-C protocol supports exchange of control information for generation, modification, and termination of GTP tunnel(s). The GTP-C protocol generates data forwarding tunnels in the case of LTE handover.

A description of the protocol stacks and interfaces illustrated in FIGS. 3 and 4 is applicable to the same protocol stacks and interfaces illustrated in FIG. 5.

Figure 6:
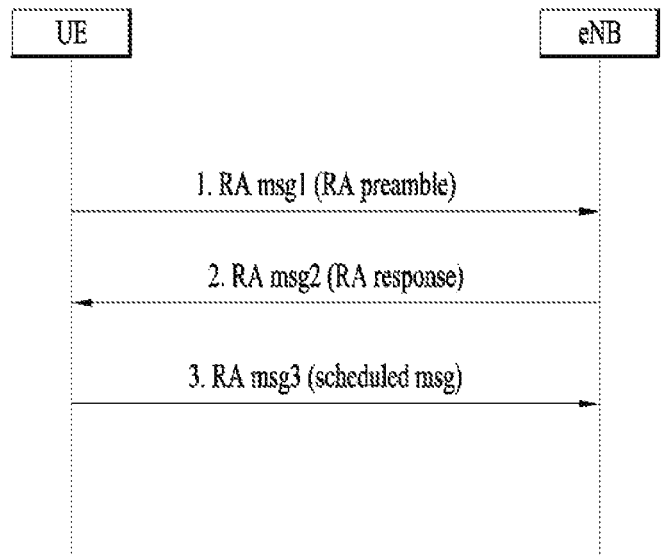
FIG. 6 is a flow diagram illustrating a random access procedure.

FIG. 6 is a flowchart illustrating a random access procedure in 3GPP LTE.

The random access procedure is used for a UE to obtain UL synchronization with a base station or to be assigned a UL radio resource.

The UE receives a root index and a physical random access channel (PRACH) configuration index from an eNB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The random access procedure, in particular, a contention-based random access procedure, includes the following three steps. Messages transmitted in the following steps 1, 2, and 3 are referred to as msg1, msg2, and msg4, respectively.

1. The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

2. Upon receiving the random access preamble, the eNB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH. The RAR includes timing advance (TA) information indicating timing offset information for UL synchronization, UL resource allocation information (UL grant information), and a temporary UE identifier (e.g., a temporary cell-RNTI (TC-RNTI)).

3. The UE may perform UL transmission according to resource allocation information (i.e., scheduling information) and a TA value in the RAR. HARQ is applied to UL transmission corresponding to the RAR. Accordingly, after performing UL transmission, the UE may receive reception response information (e.g., a PHICH) corresponding to UL transmission.

Figure 7:
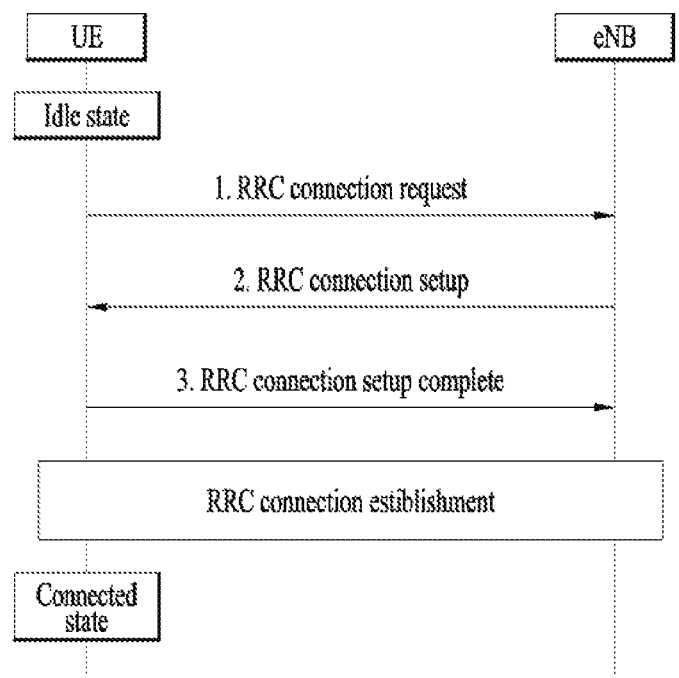
FIG. 7 is a diagram illustrating a connection procedure in a radio resource control (RRC) layer.

FIG. 7 illustrates a connection procedure in a radio resource control (RRC) layer.

As shown in FIG. 7, the RRC state is set according to whether or not RRC connection is established. An RRC state indicates whether or not an entity of the RRC layer of a UE has logical connection with an entity of the RRC layer of an eNB. An RRC state in which the entity of the RRC layer of the UE is logically connected with the entity of the RRC layer of the eNB is called an RRC connected state. An RRC state in which the entity of the RRC layer of the UE is not logically connected with the entity of the RRC layer of the eNB is called an RRC idle state.

A UE in the connected state has RRC connection, and thus the E-UTRAN may recognize presence of the UE in a cell unit. Accordingly, the UE may be efficiently controlled. On the other hand, the eNB cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, does the UE establish RRC connection with the RRC layer of the eNB through the RRC connection procedure and then transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNB, transmission of an RRC connection setup message from the eNB to the UE, and transmission of an RRC connection setup complete message from the UE to eNB, which are described in detail below with reference to FIG. 7.

1. When the UE in the idle state desires to establish RRC connection for reasons such as an attempt to make a call, a data transmission attempt, or a response of the eNB to paging, the UE transmits an RRC connection request message to the eNB first.

2. Upon receiving the RRC connection request message from the UE, the eNB accepts the RRC connection request of the UE when the radio resources are sufficient, and then transmits an RRC connection setup message, which is a response message, to the UE.

3. Upon receiving the RRC connection setup message, the UE transmits an RRC connection setup complete message to the eNB.

When new traffic occurs, the UE in an idle state performs a service request procedure to transition to an activation state in which the UE can transmit/receive traffic. When an S1 connection is released and radio resources are not allocated to the UE due to traffic deactivation although the UE is registered in the network, i.e., when the UE is in an ECM-Idle state although the UE is in an EMM-Registered state, if traffic that the UE needs to transmit or the network needs to transmit to the UE occurs, the UE transmits a service request to the network. Upon successfully completing the service request procedure, the UE transitions to an ECM-Connected state and establishes an ECM connection (i.e., RRC connection+S1 signaling connection) in a control plane and an E-RAB (i.e., DRB and S1 bearer) in a user plane, thereby transmitting/receiving traffic. When the network desires to transmit traffic to the UE which is in the ECM-Idle state, the network transmits a paging message to the UE to announce that there is traffic to be transmitted, so that the UE may perform the service request procedure.

The network triggered service request procedure will now be described in brief. When downlink data that an MME is to transmit to the UE in the ECM-Idle state occurs or signaling therefor is needed, for example, when the MME needs to perform an MME/HSS-initiated detach procedure for the ECM-Idle mode UE or an S-GW receives control signaling (e.g. Create Bearer Request or Modify Bearer Request), the MME initiates the network triggered service request procedure. If an idle mode signaling reduction (ISR) function is activated, when the S-GW receives the Create Bearer Request or Modify Bearer Request for the UE, and if the S-GW does not have a downlink S1-U and the SGSN has notified the S-GW that the UE has moved to a PMM-Idle or Standby state, the S-GW buffers signaling messages and transmits a Downlink Data Notification to trigger the MME and SGSN to page the UE. If the S-GW, while waiting for the user plane to be established, is triggered to send a second Downlink Data Notification for a bearer with higher priority (i.e., allocation and retention priority (ARP) level) than a bearer on which the first Downlink Data Notification has been sent, the S-GW sends a new Downlink Data Notification message indicating the higher priority to the MME. If the S-GW receives additional downlink data packets for a bearer with the same or higher priority as or than the bearer on which the first Downlink Data Notification message has been sent, or if the S-GW has sent the second Downlink Data Notification message indicating the higher priority and receives additional downlink data packets for this UE, the S-GW buffers these downlink data packets and does not send the new Downlink Data Notification. The S-GW will be notified about a current RAT type based on a UE triggered service request procedure. The S-GW will keep executing a dedicated bearer activation or dedicated bearer modification procedure. That is, the S-GW will send corresponding buffered signaling to the MME or SGSN where the UE currently resides and inform a P-GW of the current RAT type if the RAT type has been changed compared to the last reported RAT type. If dynamic policy and charging control (PCC) is deployed, information about the current RAT type is conveyed from the P-GW to a PCRF. If the PCRF leads to EPS bearer modification as a response, the P-GW initiates a bearer update procedure. Upon sending the Downlink Data Notification, the S-GW includes both an EPS bearer ID and ARP in the Downlink Data Notification. If the Downlink Data Notification is triggered by the arrival of downlink data packets at the S-GW, in the Downlink Data Notification, the S-GW includes the EPS bearer ID and ARP associated with a bearer on which the downlink data packets have been received. If the Downlink Data Notification is triggered by the arrival of control signaling, in the Downlink Data Notification, the S-GW includes the EPS bearer ID and ARP if present in the control signaling. If the ARP is not present in the control signaling, the S-GW includes the ARP in a stored EPS bearer context. When a local gateway (L-GW) receives downlink data for the UE in the ECM-Idle state, if an LIPA PDN connection exists, the L-GW sends the first downlink user packet to the S-GW and buffers all other downlink user packets. The S-GW triggers the MME to page the UE. Details of the network triggered service request procedure may be found in section 5.3.4.3 of 3GPP TS 23.401.

Meanwhile, the UE with traffic to be transmitted transmits an RRC connection request to the eNB through the random access procedure including steps 1) to 3) of FIG. 7. Upon accepting the RRC connection request transmitted by the UE, the eNB transmits an RRC connection setup message to the UE. Upon receipt of the RRC connection setup message, the UE transmits an RRC connection setup complete message including a service request to the eNB. Details of the UE triggered service request procedure may be found in Section 5.3.4.1 of 3GPP TS 23.401.

When the UE is in an EMM-Idle mode and needs to transmit initial NAS messages, the UE requests that a lower layer establish an RRC connection. The initial NAS messages comprise: an attach request; a detach request; a tracking area update request; a service request; and an extended service request. The service request is a message sent by the UE to a network to request the establishment of a NAS signaling connection and the establishment of radio and S1 bearers. The extended service request is a message sent by the UE to the network to initiate a CS fallback or 1×CS fallback call or respond to a mobile terminated CS fallback or 1×CS fallback request from the network; or to request the establishment of a NAS signaling connection and the establishment of radio and S1 bearers for packet services if the UE needs to provide additional information that cannot be provided via the service request message.

The purpose of the service request procedure is to transfer an EMM mode from EMM-IDLE to EMM-CONNECTED. If the UE is not using control plane CIoT EPS optimization, which will be described later, the service request procedure is used to establish the radio and S1 bearers when user data or signaling is to be sent. If the UE is using control plane CIoT EPS optimization, the service request procedure may be used for UE-initiated transfer of CIoT data. The service request procedure is used when: the network has downlink signaling pending; the UE has uplink signaling pending; the UE or the network have user data pending and the UE is in the EMM-IDLE mode; or the UE in the EMM-IDLE or EMM-CONNECTED mode has requested to perform mobile originating/terminating CS fallback or 1×CS fallback. The service request procedure is initiated by the UE. However, for downlink transfer of signaling, cdma2000® signaling, or EMM-IDLE mode, triggering is given by the network by means of a paging procedure.

During an EPS attach procedure, (i.e., if the UE requests PDN connectivity by sending an attach request) the network may activate a default EPS bearer context. Additionally, the network may activate one or several dedicated EPS bearer contexts in parallel with respect to PDN connections of an IP PDN type. For this purpose, EPS session management (ESM) messages for default EPS bearer context activation may be transmitted in an information element in EPS mobility management (EMM) messages. The UE and the network execute an attach procedure, a default EPS bearer context activation procedure, and a dedicated EPS bearer context activation procedure in parallel. The UE and the network should complete the combined default EPS bearer context activation procedure and attach procedure before the dedicated EPS bearer context activation procedure is completed. The success of the attach procedure depends on the success of the default EPS bearer context activation procedure (if EMM-REGISTERED without PDN connection is not supported by the UE or the MME). If the attach procedure fails, then an ESM procedure also fails.

The EMM messages comprise, for example, Attach Accept, Attach Complete, Attach Reject, Attach Request, Authentication Failure, Authentication Reject, Authentication Request, Authentication Response, CS Service Notification, Detach Accept, Detach Reject, Downlink NAS Transport, EMM Information, EMM Status, Extended Service Request, Service Request, Service Reject, Tracking Area Update Accept, Tracking Area Update Complete, Tracking Area Update Reject, Tracking Area Update Request, Uplink NAS Transport, Downlink Generic NAS Transport, and Uplink Generic NAS Transport. The ESM messages comprise, for example, Activate Dedicated EPS Bearer Context Accept, Activate Dedicated EPS Bearer Context Reject, Activate Dedicated EPS Bearer Context Request, Activate Dedicated EPS Bearer Context Accept, Activate Default EPS Bearer Context Accept, Activate Default EPS Bearer Context Reject, Activate Default EPS Bearer Context Request, Bearer Resource Allocation Reject, Bearer Resource Allocation Request, Bearer Resource Modification Reject, Bearer Resource Modification Request, Deactivate EPS Bearer Context Accept, Deactivate EPS Bearer Context Request, ESM Information Request, ESM Information Response, and ESM Status. For details of the EMM messages and the ESM messages defined up to now, refer to 3GPP 24.301 V13.4.0.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

It is expected that a number of devices will be wirelessly connected to each other through the Internet of Things (IoT). The IoT means internetworking of physical devices, connected devices, smart devices, buildings, and other items with electronics, software, sensors, actuators, and network connectivity that enable these objects to collect and exchange data. In other words, the IoT refers to a network of physical objects, machines, people, and other devices that enable connectivity and communication for the purpose of exchanging data for intelligent applications and services. The IoT allows objects to be sensed and controlled remotely through existing network infrastructures, thereby providing opportunities for the direct integration between the physical and digital worlds, which result in improving efficiency, accuracy and economic benefits. Particularly, in the present invention, the IoT using the 3GPP technology is referred to as cellular IoT (CIoT). In addition, the CIoT that transmits/receives IoT signals using a narrowband (e.g., a frequency band of about 200 kHz) is called NB-IoT.

The CIoT is used to monitor traffic transmitted over a relatively long period, e.g., from a few decades to a year (e.g., smoke alarm detection, power failure notification from smart meters, tamper notification, smart utility (gas/water/electricity) metering reports, software patches/updates, etc.) and support UT' devices characterized as ultra-low complexity, power limitation and low data rates.

In the prior art, a connection with the network should be established for transmitting data to a UE in EMM-Idle mode. To this end, the UE should successfully complete the service request procedure illustrated in FIG. 8, but it is not suitable for the CIoT that requires optimized power consumption for the low data rate. To transmit data to an application, two types of optimization: User Plane CIoT EPS optimization and Control Plane CIoT EPS optimization has been defined for the CIoT in the EPS.

The User Plane CIoT EPS optimization and Control Plane CIoT optimization can be referred to U-plane CIoT EPS optimization and C-plane CIoT EPS optimization, respectively.

The Control Plane CIoT EPS optimization is signaling optimization capable of efficient transport of user data (IP or non-IP or SMS) on the control plane. In the case of a Control Plane CIoT EPS optimization solution, there is no setup data radio bearer, but data packets are transmitted on signaling radio bearer(s). In other words, unlike legacy data transmission in which data is transmitted via a path of UE-eNB-SGW by setting up a DRB after transitioning to an idle-to-connected mode, Control Plane CIoT EPS optimization uses a method of loading up a data PDU in a NAS message to be transferred through an SRB. For Control Plane CIoT EPS optimization, the NAS message for data transport and a (GTP—U based) S11-U, which is a new interface for data transport between the MME and the SGW, are defined. In Control Plane CIoT EPS optimization, a connection of a newly defined path of UE-eNB-MME-SGW is defined as a PDN connection although an existing DRB is not used, a state in which the SRB is set up to be able to transport data is also defined as a connected mode/state, and an S1 release procedure is performed after transport of the data. Notably, unlike a legacy S1 release procedure for releasing an S1-U interface (refer to Section 5.3.5 of 3GPP TS 23.401), in Control Plane CIoT EPS optimization, the S11-U interface, rather than the S1-U interface, is released through an S1 release procedure.

Meanwhile, Data Plane CIoT EPS optimization releases an RRC connection during a connected-to-idle mode transition with the goal of reducing signaling during an idle-to-connected mode transition for data transmission. Herein, Data Plane CIoT optimization defines a suspended state in which the eNB keeps the context of the UE without deleting the same unlike a legacy idle mode in which the eNB release the RRC connection and deletes a context of the UE during a connected-to-idle mode transition, a connection suspend procedure in which the eNB enters the suspended state, and a connection resume procedure in which the eNB transitions again to a connected mode from the suspended state. Although Data Plane CIoT EPS optimization needs to transfer data through an existing DRB, that is, the S1-U, access stratum (AS) parameters are cached in the eNB even during a connected-to-idle mode transition of the UE.

Figure 8:
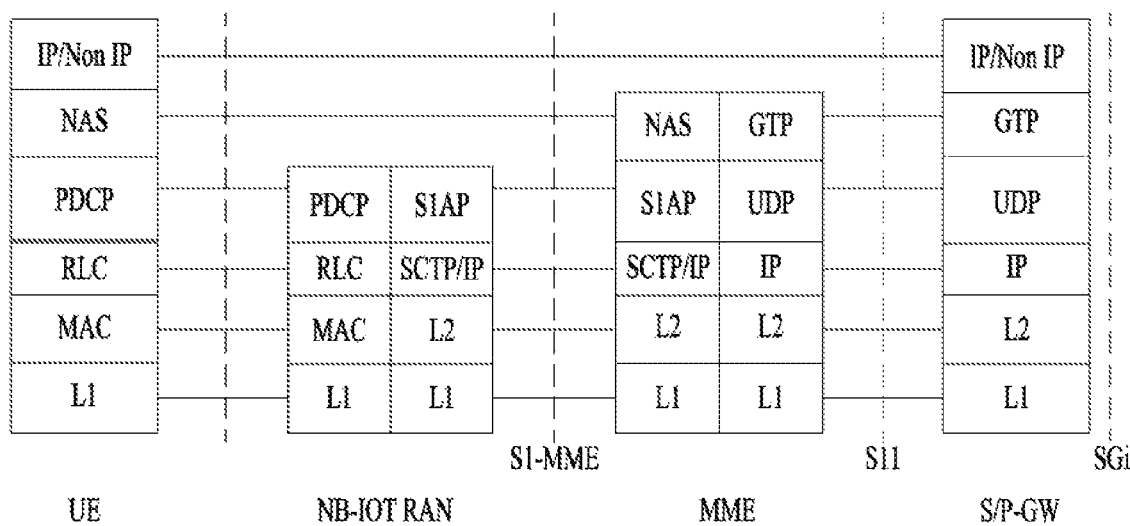
FIG. 8 illustrates user plane protocol stacks between a UE and a P-GW in accordance with the Control Plane CIoT EPS optimization.

FIG. 8 illustrates user plane protocol stacks between a UE and a P-GW in accordance with the Control Plane CIoT EPS optimization.

Referring to FIG. 8, GTP-u is a protocol which tunnels user data between the MME and S-GW as well as between the S-GW and P-GW in the backbone network. GTP encapsulates all end user IP packets. UDP/IP are the backbone network protocols used for routing user data and control signaling. NAS is the non-access stratum layer used to carry data between the UE and MME and may include header compression and security functions for user plane IP data.

The CIoT network or technology mainly provides communication services optimized for the IoT UE in terms of the core network, and the NB-IoT (narrowband Internet of Thing) network or technology optimizes the radio interface of the existing LTE technology for IoT.

As its name implies, the NB-IoT is a wireless technology that provides IoT services using a narrowband frequency of about 200 kHz. Compared to the conventional LTE technology using the minimum frequency band of about 1.25 MHz, the NB-IoT uses a very small frequency band. Therefore, the NB-IoT minimizes the processing power and power consumption of the UE.

The CIoT is a technology that minimizes the power consumption of the UE through the C-plane solution (that is, data is processed by the MME) or the U-plane solution (that is, even if the UE is in the RRC_IDLE state or a similar state, the UE and eNB maintains the context and use the context for the next connection in order to prevent the power consumption issue of the UE, which is caused because a number of messages are exchanged during the conventional attach (see section 5.3.2 at 3GPP TS 23.401) or service request procedure (see section 5.3.4 at 3GPP TS 23.401).

Therefore, the NB-IoT radio technology and CIoT technology can be applied separately. That is, even if the NB-IoT radio technology is not used, it is possible to apply the CIoT technology through the conventional LTE radio network. This means that the CIoT technology can be applied to UEs that cannot use the NB-IoT radio technology, for example, UEs already released with the LTE radio technology only. In addition, it means that conventional LTE radio technology based cells can support conventional LTE UEs such as smart phones while simultaneously supporting IoT UEs.

The S1 mode means that the UE uses the S1 interface between the radio access network and core network. In the S1 mode, the UE accesses network services via the E-UTRAN. In the multi-access system, the S1 mode is divided into the WB-S1 mode and the NB-S1 mode according to the current radio access network.

In the multi-access system, if the current serving E-UTRA provides the S1 mode in accordance with the NB-IoT, the system is considered to operate in the NB-S1 mode (see 3GPP TS 24.301, 3GPP TS 36.300, 3GPP TS 36.331, and 3GPP TS 36.306). In addition, in the multi-access system, if the system operates in the S1 mode rather than the NB-S1 mode, the system is considered to operate in the WB-S1 mode. In other words, the CIoT mode includes the WB-S1 and NB-S1 modes, and the NB-IoT corresponds to the NB-S1 mode. Except the NB-IoT, the rest of the CIoT except including the conventional LTE may correspond to the WB-S1 mode.

Figure 9:
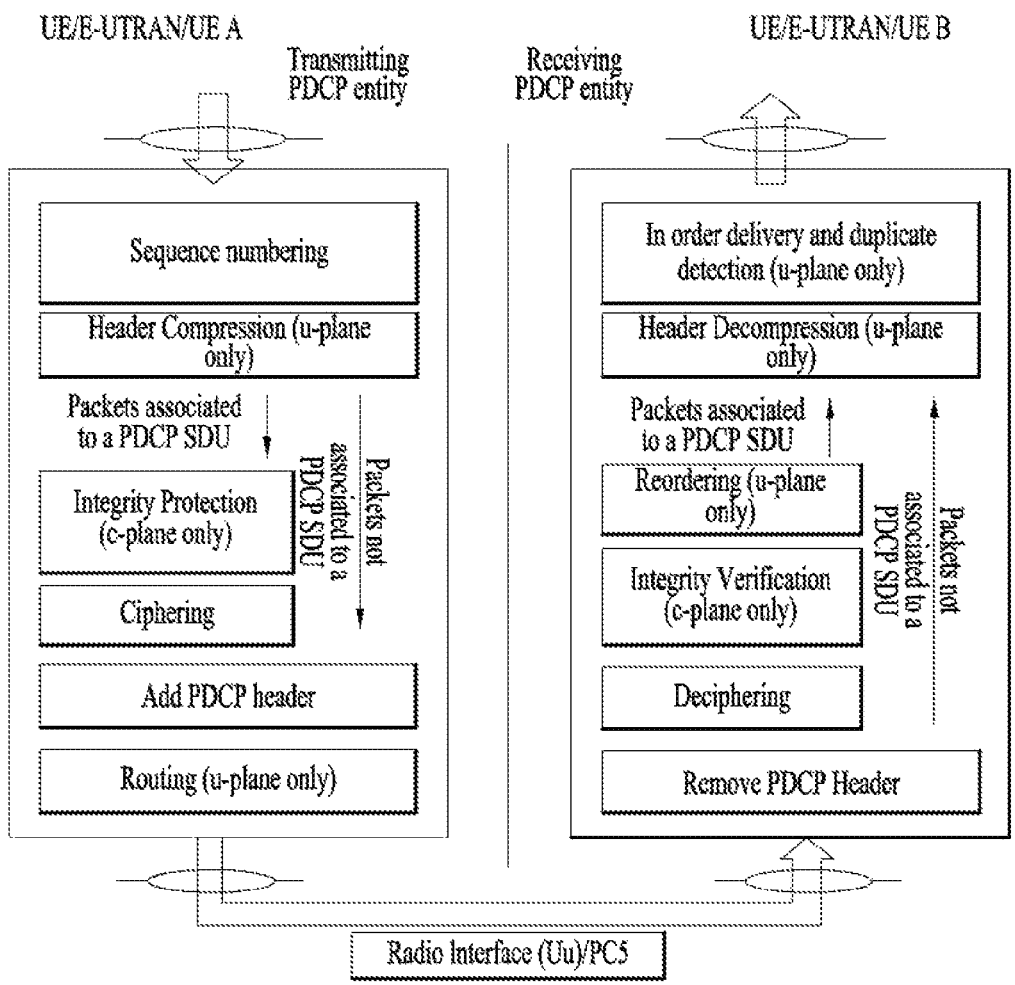
FIG. 9 illustrates a functional view of a PDCP layer in an LTE/LTE-A system.

FIG. 9 illustrates a functional view of a PDCP layer in an LTE/LTE-A system. For details of the PDCP layer, refer to the document 3GPP TS 36.323.

One of differences in operation between control plane (CP) optimization and user plane (UP) optimization is an operation of the PDCP layer. For example, when data is transmitted through UP optimization or a legacy S1-U/DRB, PDCP layers of a UE and an eNB are in charge of an AS security operation and an IP header compression operation. However, since CP optimization uses an SRB, such operations in the PDCP layers are skipped.

In the case of CP optimization, the PDCP layers operate in a PDCP-transparent mode (PDCP-TM) in which main operations thereof are skipped. That is, according to CIoT EPS optimization used, operations of the PDCP layers may differ or a PDCP may or may not be used.

Logical channels using the PDCP are defined in the standard specification. The standard specification for the PDCP (e.g., 3GPP TS 36.323) specifies that the PDCP is used for SRBs, DRBs, and sidelink radio bearers (SLRBs) (carrying sidelink communication data), mapped onto logical channels of dedicated control channel (DCCH), dedicated traffic channel (DTCH), and sideline traffic channel (STCH) types. In other words, a broadcast control channel (BCCH), a paging control channel (PCCH), a common control channel (CCCH), a multicast traffic channel (MTCH), a multicast control channel (MCCH), a sidelink broadcast channel (SBCCH), a single cell multicast control channel (SC-MCCH), and a single cell multicast transport channel (SC-MTCH) bypass the PDCP.

However, in a CP solution, i.e., CP optimization, data is transferred over SRB1. SRB1 always uses the PDCP with security applied. Accordingly, when the PDCP is used in CP optimization, a 1-byte PDCP header and a 4-byte MAC-I are always included regardless of whether AS security is activated. This causes 5-byte overhead even for CP optimization. Therefore, it is better to bypass the PDCP for SRB1 in the CP solution. SRB1 is configured with the PDCP as legacy to support AS security. Hence, the PDCP should be configured for SRB1 in the UP solution. When the UE transmits msg 5 (e.g., RRC connection setup complete message) in a random access procedure, how the eNB can know whether the PDCP is used or not is problematic if the CP or UP solution has not been indicated.

One of discussed methods as a solution to this problem is using a new SRB, rather than a legacy SRB, according to whether the PDCP is used, instead of transmitting all NAS messages through one SRB (i.e., SRB1) as in a conventional manner. In this case, a legacy NAS message used for signaling and a NAS message for CP optimization to transport data may be effectively separated without affecting use of legacy SRB1.

Problem 1. Selection of SRB

When an NB-IoT UE supports both CP optimization and UP optimization or when a UE using LTE/E-UTRAN supports both CP optimization and UP optimization, the following situations may be considered.

As described earlier, a separate SRB or RB may be used depending upon whether the PDCP is used or not. That is, when legacy S1-U or UP optimization is used, SRB1 may be used as in a conventional manner and, when CP optimization is used, a new RB (hereinafter, SRB3) may be used. SRB3 is used instead of SRB1 in CP optimization. SRB3 is identical to SRB1 except that the PDCP is bypassed. In other words, SRB3 has the same configuration as that of SRB1 except for the PDCP. A problem generated when SRB3 is used in CP optimization is that a UE supporting both CP optimization and UP optimization or both CP optimization and S1-U cannot be aware of which path the UE should select according to received data. For example, when the UE is using CP optimization, the UE should transmit a NAS message containing data on SRB3 and, when the UE is using UP optimization, the UE should transmit the NAS message on SRB1. However, an AS is not able to know whether a NAS message received from a higher layer is a message of a signaling type for legacy S1-U or UP optimization or a message of a data type for CP optimization, so that a selection problem about through which SRB the NAS message received from the higher layer should be transmitted occurs even though the new SRB is generated.

Problem 2. Prioritizing Between NAS Signaling and Data Over NAS

Conventionally, signaling has been transported through an SRB and data has been transported through a DRB. Because a message of a signaling type and a message of a data type have not been transported through the same path, the case in which the message of the signaling type and the message of the data type should be transmitted through the same path at the same timing has not occurred. Therefore, which of signaling and data on the same RB should be prioritized does not need to be considered.

However, if the UE uses CP optimization, the UE transmits data through a path of eNB-MME-SGW, rather than a user plane, by piggybacking the data on a NAS message. Herein, the NAS message may be a legacy NAS message or a NAS message defined newly for data transport. In this way, when the UE transmits data as well as legacy signaling through the NAS message, the following problems may arise.

The UE or the eNB transmits mobile-originated (MO)/mobile-terminated (MT) data through the SRB in the NAS message. Herein, not only a NAS message of such a data type, i.e., a NAS message for user data, but also a NAS message for legacy signaling (e.g., EMM/ESM message) is transmitted through the SRB. An AS layer is not able to be aware of whether a currently transmitted NAS message is a data type or a signaling type because the NAS message is transparent with respect to AS layers. However, if the message of the data type and the message of the signaling type are concentrated on the AS layer at one moment, the AS layer transmits the messages starting from a first requested message based on first-come first-serve (FCFS) without distinguishing between the message types according to standards up to now. However, in many cases, it may be necessary to prioritize signaling among data and signaling. Prioritizing signaling over data may be needed when prioritization in a queue of a transmitter of the UE is necessary or when the eNB determines which of data and signaling of multiple UEs should be processed first. For example, the UE may need to configure a path through a tracking area update procedure (refer to Section 5.3.3 of 3GPP TS 23.401) due to change of an MME while transmitting data. In addition, the eNB may receive, at a timing when data of any UE is received, signaling of another UE. However, according to standards up to now, it is impossible for the AS layer of the UE and the AS of the eNB to distinguish between the NAS message of the data type and the NAS message of the signaling type. Accordingly, the UE and the eNB cannot cope with the case in which signaling should be prioritized over data.

Problem 3. Prioritizing Problem in MT

Problem 1 and Problem 2 described above may occur even in an MT case. Since the eNB is unable to discern a type (data/signaling) of a NAS PDU, the eNB cannot perform procedures such as an SRB allocation or signaling prioritizing processing for a downlink NAS PDU.

<Inventive Proposal 1. EPS Optimization Usage/NAS Notification of NAS Type>

The present invention proposes a method of selecting a proper one of multiple RBs by a UE using CP optimization or supporting both CP optimization and UP optimization.

The present invention proposes a method of selecting a proper one of multiple RBs or determining which type of NAS PDU should be prioritized, during occurrence of uplink or MO traffic, by a UE using CP optimization or supporting both CP optimization and UP optimization.

Figure 10:
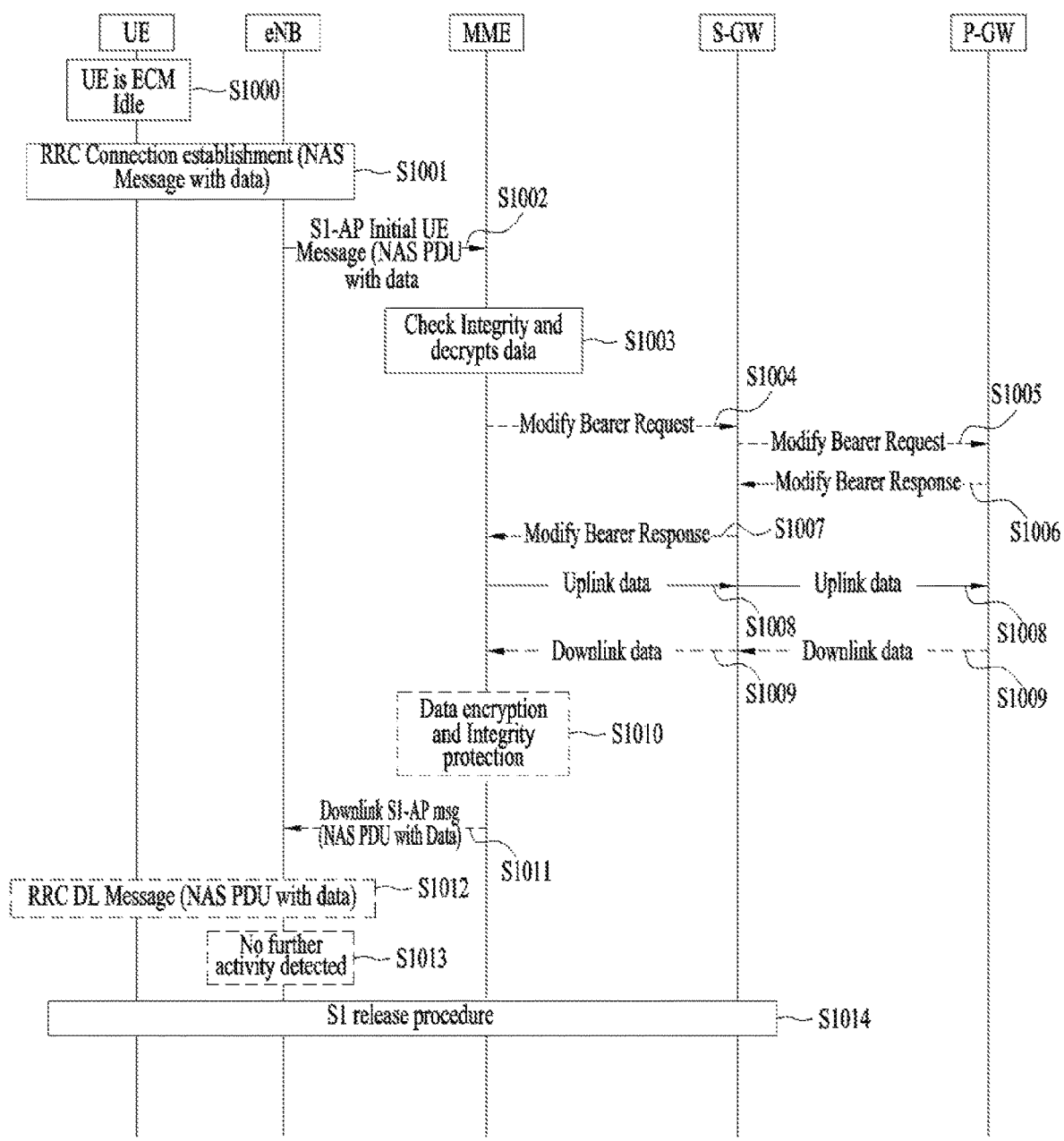
FIG. 10 is a flowchart of a method of transporting mobile originated (MO) data in Control Plane CIoT EPS optimization.

FIG. 10 is a flowchart of a method of transporting MO data in CP CIoT EPS optimization. In CP CIoT EPS optimization illustrated in FIG. 10, for a detailed description of MO data transport, refer to Section 5.3.4B.2 of 3GPP TS 23.401.

When MO data for the UE using CP optimization occurs, the MO data is also transmitted to a network as illustrated in FIG. 10. When the UE is in an idle mode (S1000), the UE performs a service request for transition to a connected mode (S1001). In this case, when the UE uses CP CIoT optimization, the UE transfers a NAS PDU to the network through a CP interface rather than a UP interface.

Commonly, the UE determines information to be transferred to an AS layer by combining CIoT EPS optimization information that the UE currently uses or is usable and a NAS message type that the UE is to currently transmit. The following classification may be made.

Option 1)

Case in which a signaling message is transmitted using CP CIoT EPS optimization: NAS signaling.

E.g., normal EMM/ESM message.

Case in which a data message is transmitted using CP CIoT EPS optimization: NAS data.

E.g., all NAS message types for transporting a NAS PDU, such as extended service request or data service request with NAS PDU/generic NAS transport or ESM NAS container message.

Case in which a signaling message is transmitted using UP CIoT EPS optimization: NAS signaling.

E.g., EMM message, ESM message, service request for DRB setup, etc.

Option 2)

Case in which a signaling message is transmitted using UP CIoT EPS optimization: NAS signaling.

E.g., attach, tracking area update (TAU), ESM message.

When CP CIoT EPS optimization is used,

Case in which the UE transmits an initial message for data transmission in an idle mode: NAS signaling.

E.g., NAS message for executing initial setup, such as extended service request with NAS PDU/data service request.

Case in which the UE transmits a NAS message for data transmission in a connected mode: NAS data.

E.g., NAS message for transporting only a NAS PDU, such as generic NAS transport/ESM NAS container message.

Case in which a signaling message is transmitted using UP CIoT EPS optimization: NAS signaling.

E.g., EMM message, ESM message, service request for DRB setup, etc.

Figure 11:
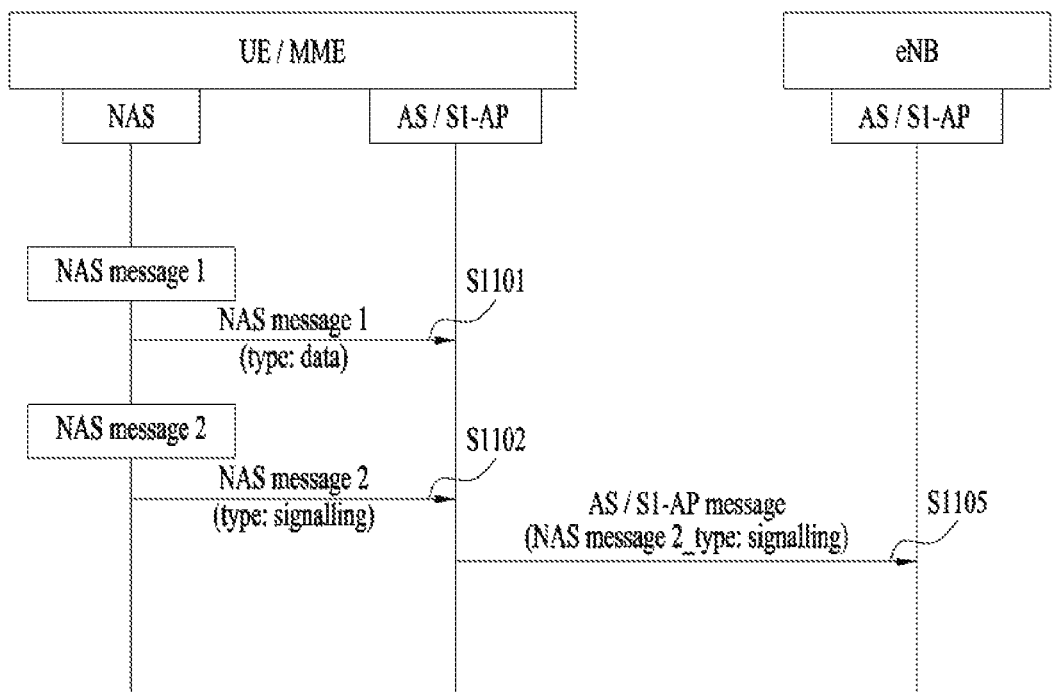
FIG. 11 illustrates a method of transmitting a non-access stratum (NAS) message according to the present invention.

FIG. 11 illustrates a method of transmitting a NAS message according to the present invention. In particular, in FIG. 11, "UE/MME" represents "UE" in Inventive Proposal 1 and represents "MME" in Inventive Proposal 2 which will be described later. In FIG. 11, "AS/S1-AP" represents "AS" in Inventive Proposal 1 and represents "S1-AP" in Inventive Proposal 2.

When a NAS layer transmits a new NAS message, the UE may inform an AS layer of a type of the NAS message that the UE is to transmit according to the above-determined classification or other classification (S1101 and S1102). For example, the NAS layer of the UE should inform the AS layer of whether the NAS message is NAS data or NAS signaling according to the above-determined classification (S1101 and S1102). In order for the UE in an idle mode to transmit an initial message, the RRC layer should generate an SRB. When the SRB has two types or more, the AS layer determines which SRB should be set up to transmit the NAS message, based on this type information. In other words, an SRB to be set up may be selected according to whether the message is a message of a signaling type or a message of a data type. For example, if the NAS layer informs the AS layer that the NAS message is NAS data, the AS layer may set up legacy SRB1 and, if the NAS layer informs the AS layer that the NAS message is NAS signaling, the AS layer may set up new SRB3. This may be implemented using a method in which the NAS layer signals an indication to the AS layer or may be implemented through an internal operation of the UE. After a corresponding SRB is selected, setup of the SRB and actual transmission by the AS layer may conform to a conventional operation.

In the above description, the AS layer of the UE may determine through which SRB the NAS message is to be transmitted based on the NAS message type information received from the NAS layer. If a type of an SRB or a type of a channel/RB through the NAS PDU is transmitted is one as in a conventional manner or if both a NAS message of a data type or a NAS message of a signaling type can be transmitted through the same SRB, the UE may apply one of the following two operations or may simultaneously apply the two operations.

1-1) Outgoing Queue Priority of Interior of UE

When only one type of SRB is present and signaling and data are simultaneously generated, the UE may preferentially transmit the signaling (S1105).

1-2) Inclusion of Indication in RRC Message

The AS layer of the UE receives the NAS PDU and the NAS message type information from the NAS layer (S1101 and S1102). If only one type of SRB is present, the AS layer of the UE may include the NAS type information in an RRC message (S1105). A transceiver of the UE transmits a NAS message type as well as a legacy NAS PDU (S1101). When a transceiver of the eNB receives the NAS message type and the legacy NAS PDU and an RRC layer receives the NAS message type and the legacy NAS PDU, the RRC layer of the eNB may be aware of whether a NAS PDU which is currently piggybacked on an RRC message is NAS signaling or NAS data, based on the NAS message type information. The eNB may apply differentiated handling between the NAS signaling and the NAS data based on this information. For example, the eNB may preferentially transmit the signaling to the MME. When the eNB is in an overload or congestion situation so that packets should be dropped, the data may be dropped first.

<Inventive Proposal 2. Notification of Network about NAS Type for MT NAS Message>

The present invention is to propose a method in which a core network or an eNB selects a proper one of multiple RBs or the eNB determines which type of NAS PDU should be prioritized, when a UE using CP optimization or supporting both CP optimization and UP optimization is serviced by a network.

Figure 12:
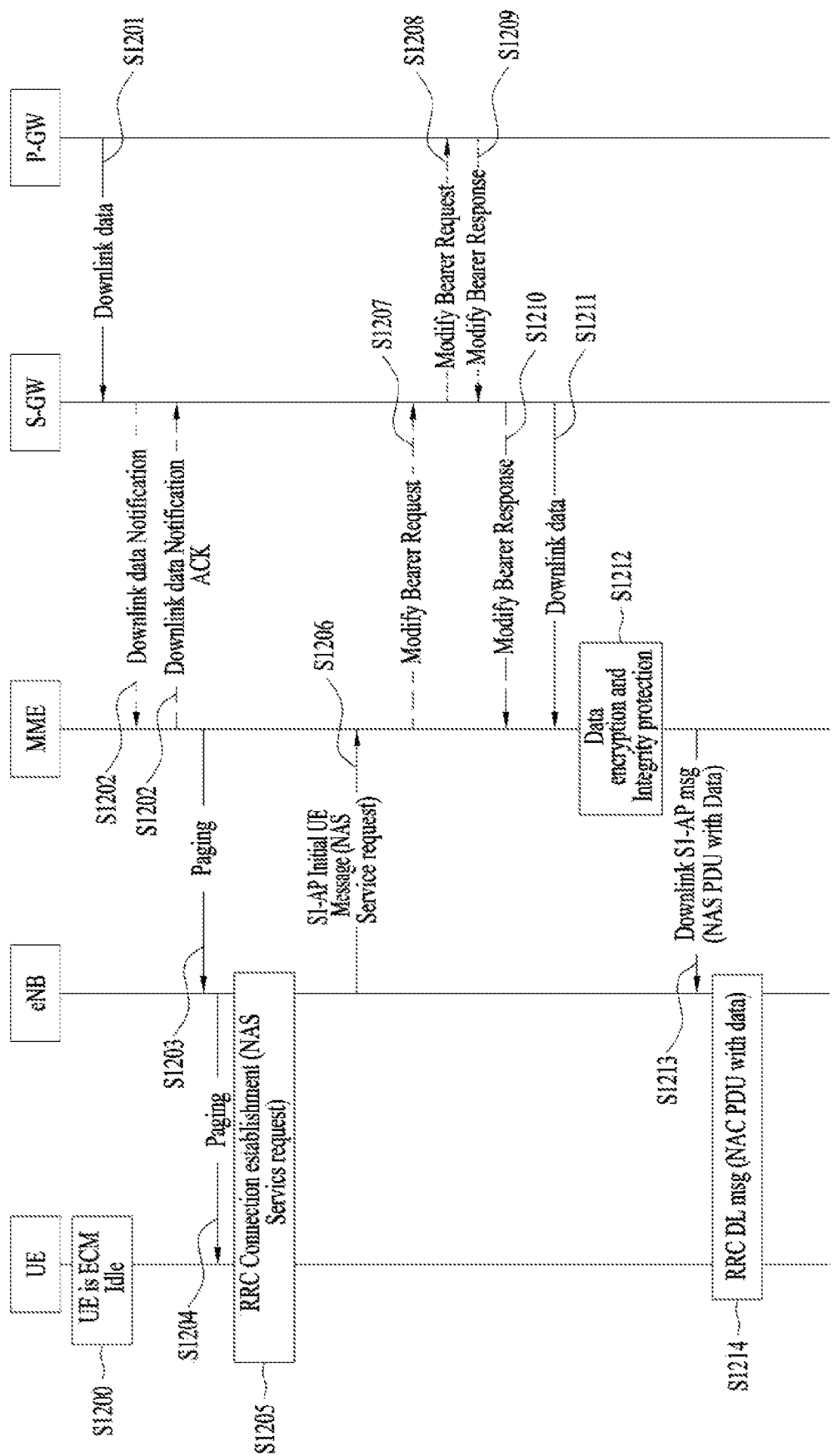
FIG. 12 is a flowchart of a method of transporting mobile terminated (MT) data in Control Plane CIoT EPS optimization.

FIG. 12 is a flowchart of a method of transporting MT data in CP CIoT EPS optimization. In CP CIoT EPS optimization illustrated in FIG. 11, for a detailed description of MT data transport, refer to Section 5.3.4B.3 of 3GPP TS 23.401.

When MT data for a UE using CP optimization occurs (S1201), a network transfers the MT data as illustrated in FIG. 12.

Like a conventional operation, an SGW transfers a downlink data notification (DDN) to an MME (S1202), the MME transfers paging to an eNB (S1203), and the eNB transfers the paging to the UE (S1204). When the UE is in an idle mode (S1200), the UE performs a service request for transition to a connected mode (S1205). In this case, when the UE uses CP CIoT optimization, the SGW transfers data to the MME not through an S1-U interface but through an S11 interface (which is a user plane interface between the MME and the SGW) and the MME transfers the data to a NAS using an ESM data transport message.

Commonly, the MME determines information to be transferred to an S1-AP layer by combining CIoT EPS optimization information that the UE currently uses or is usable and a NAS message type that the UE is to currently transmit (S1213). The following classification may be made.

Case in which a signaling message is transmitted using CP CIoT EPS optimization or UP CIoT EPS optimization: NAS signaling.

E.g., normal MT ESM message.
ACTIVATE DEFAULT EPS BEARER CONTEXT REQUEST
ACTIVATE DEDICATED EPS BEARER CONTEXT REQUEST
MODIFY EPS BEARER CONTEXT REQUEST
DEACTIVATE EPS BEARER CONTEXT REQUEST
Case in which a data message is transmitted using CP CIoT EPS optimization: NAS data.
E.g., all NAS message types for transporting a NAS PDU, such as an ESM data transport message, etc.

Referring to FIG. 11, when the NAS layer transmits a new NAS message, the NAS layer of the MME may inform the S1-AP layer of a NAS message type that the MME desires to transmit according to the above-determined classification and other classification (S1101, S1102). For example, according to the above-determined classification, the NAS layer informs the AS layer, which is a lower layer, of whether the NAS message is NAS data or NAS signaling.

When the NAS PDU is transmitted to the eNB through the S1-AP layer, since the eNB is unaware of whether the currently transmitted NAS PDU is data or signaling, the MME may transmit the NAS PDU to the S1-AP using the following methods.

2-1) Outgoing Queue Priority of Interior of MME

If signaling and data are simultaneously generated when the MME transmits the NAS PDU to the S1-AP, signaling may be preferentially transmitted (S1105).

2-2) Inclusion of Indication in S1-AP Message

The S1-AP of the MME receives the NAS PDU and NAS message type information (indicating whether the NAS message is data or signaling) from the NAS of the MME (S1101 and S1102). The MME may include separate information (hereinafter, NAS message type information) indicating the type of the NAS PDU in the S1-AP message including the NAS PDU while transmitting the NAS PDU to the eNB through the S1-AP (S1101 and S1102). This may be implemented through an additional information element (IE) or flag in the S1-AP message. A transceiver of the MME may transmit an S1-AP message including such new information to the eNB. In this case, priority handling between signaling and data may be applied as proposed in 2-1) (S1105). When a transceiver of the eNB receives the S1-AP message, the S1-AP layer of the eNB may be aware of whether the NAS PDU piggybacked on the S1-AP message is NAS signaling or NAS data through the NAS message type information included in the MME. The eNB may apply differentiated handling between the NAS signaling and the NAS data based on this information. For example, the eNB may preferentially transmit the signaling to the UE. If the eNB is in an overload or congestion situation so that packets should be dropped or buffered, the data may first be drop or buffered.

Figure 13:
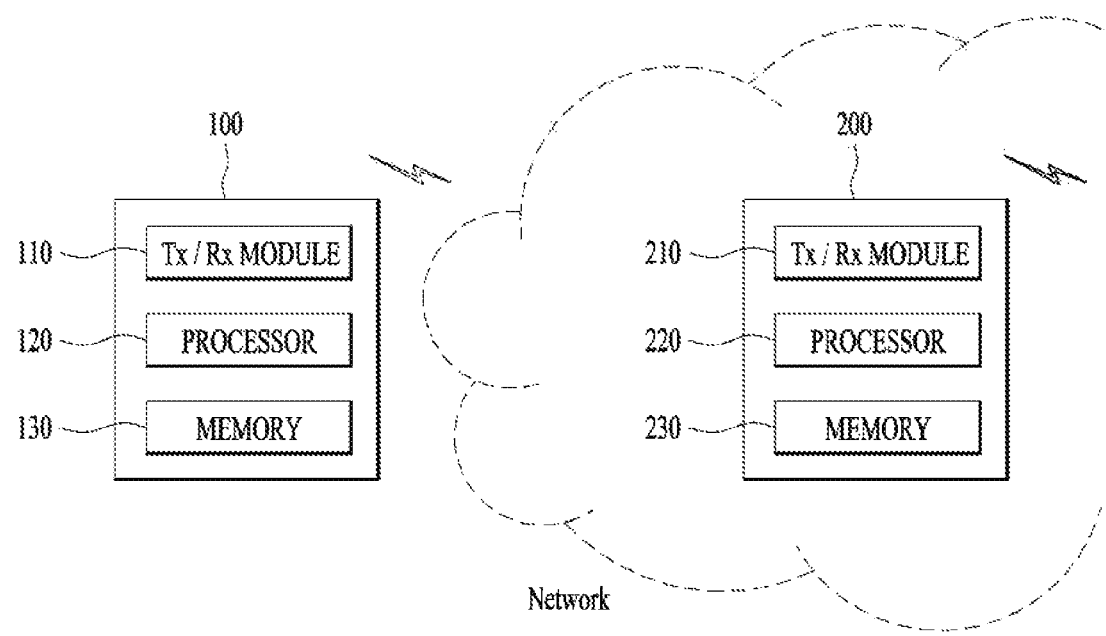
FIG. 13 illustrates a node according to an example of the present invention.

FIG. 13 illustrates configuration of a UE and a network node according to a preferred implementation example of the present invention.

The UE 100 according to the present invention may include a transceiver 110, a processor 120, and a memory 130. The transceiver 110 may be referred to as a radio frequency (RF) unit. The transceiver 110 may be configured to transmit and receive various signals, data and information to and from an external device. The UE 100 may be connected to the storage device by wire and/or wirelessly. The processor 150 may control overall operation of the UE 100, and be configured to calculate and process information for the UE 100 to transmit and receive to and from the external device. In addition, the processor 120 may be configured to perform the proposed operations of the UE. The memory 130 may store the calculated and processed information for a predetermined time, and may be replaced by another constituent such as a buffer (not shown).

Referring to FIG. 13, the network node 200 according to the present invention may include a transceiver 210, a processor 220 and a memory 230. The transceiver 210 may be referred to as an RF unit. The transceiver 210 may be configured to transmit and receive various signals, data and information to and from an external device. The network node 200 may be connected to the storage device by wire and/or wirelessly. The processor 220 may control overall operation of the network node 200, and be configured to calculate and process information for the network node 200 to transmit and receive to and from the external device. In addition, the processor 220 may be configured to perform the proposed operations of the network node. The memory 230 may store the calculated and processed information for a predetermined time, and may be replaced by another constituent such as a buffer (not shown).

For configuration of the UE 100 and the network apparatus, the details described in various examples of the present invention may be independently applied or implemented such that two or more examples are simultaneously applied. For simplicity, redundant description is omitted.

The examples of the present invention may be implemented through various means. For example, the examples may be implemented by hardware, firmware, software, or a combination thereof.

When implemented by hardware, a method according to examples of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to examples of the present invention may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

As described above, the detailed description of the preferred examples of the present invention has been given to enable those skilled in the art to implement and practice the invention. Although the invention has been described with reference to exemplary examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

INDUSTRIAL APPLICABILITY

The communication method described above is applicable to various wireless communication systems including IEEE 802.16x and 802.11x systems as well as a 3GPP system. Furthermore, the proposed method is applicable to a millimeter wave (mmWave) communication system using an ultrahigh frequency band.

The invention claimed is:

1. A method of transmitting a message by a user equipment (UE), the method comprising:
    generating, by a NAS layer, a non-access stratum (NAS) message;
    transferring, by the NAS layer, the NAS message and type information to an access stratum (AS) layer,
    wherein the type information informs whether the NAS message is a first type message with user data or a second type message with no user data; and
    transmitting an AS message containing the NAS message to a network,
    wherein transmitting the AS message comprises:
        based on the AS layer receiving the NAS message which is transmitted using control plane (CP) cellular Internet of things (CIoT) evolved packet system (EPS) optimization from the UE, transmitting, by the AS layer, the AS message to the network through a first signaling radio bearer (SRB) with no packet data convergence protocol (PDCP), and based on the AS layer receiving the NAS message which is transmitted not using the CP CIoT EPS optimization from the UE, transmitting, by the AS layer, the AS message to the network through a second SRB with the PDCP.

2. The method according to claim 1, wherein the AS message is a radio resource control (RRC) message.

3. A user equipment (UE) for transmitting a message, the UE comprising,
   a transceiver, and
   a processor configured to control the transceiver, the processor configured to:
   generate, at a NAS layer, a non-access stratum (NAS) message;
   transfer the NAS message and type information from the NAs layer to an access stratum (AS) layer,
   wherein the type information informs whether the NAS message is a first type message with user data or a second type message with no user data; and
   control the transceiver to transmit an AS message containing the NAS message to a network, and
   wherein controlling the transceiver to transmit the AS message comprises:
     based on the AS layer receiving the NAS message which is transmitted using control plane (CP) cellular Internet of things (CIoT) evolved packet system (EPS) optimization from the UE, control the transceiver to transmit the AS message to the network through a first signaling radio bearer (SRB) with no packet data convergence protocol (PDCP), and
     based on the AS layer receiving the NAS message which is transmitted not using CP CIoT EPS optimization from the UE, control the transceiver to transmit the AS message to the network through a second SRB with the PDCP.

4. The UE according to claim 3, wherein the AS message is a radio resource control (RRC) message.

\* \* \* \* \*